Patented June 22, 1954

2,681,903

UNITED STATES PATENT OFFICE 2,681,903

POLYMERIZATION OF ISO-OLEFINS IN CYCLOPARAFFIN DILUENTS

Jack Linsk, Hammond, Ind., assignor to Standard Oil Company, Chicago, Ill., a corporation of Indiana No Drawing. Application April 16, 1952,
Serial No. 282,706

18 Claims. (Cl. 260—94.8)

This invention relates to the polymerization of iso-olefins and to the copolymerization of iso-olefins and diolefins. More particularly, the invention relates to the reaction medium in which the polymerization is normally carried out.

Iso-olefins such as isobutylene, isopentenes and isohexenes can be polymerized to produce materials ranging from liquids to solids. Also, iso-olefins can be polymerized with diolefins such as butadiene and isoprene to produce solids which have elastic rubbery characteristics. In order to produce materials of high enough molecular weight to be useful as viscosity index improvers, elastomers, synthetic rubbers, etc., it is necessary to carry out the polymerization reaction at temperatures below about 0° C.; when solid materials having rubbery characteristics are desired, the polymerization reaction is normally carried out below about −50° C. The polymerization reaction is carried out in the presence of a catalyst such as $AlCl_3$, $BF_3$, etc. Usually the reaction is carried out in the presence of an inert material which serves as a diluent for the reactant(s) and the catalyst, and which does not participate in the reaction. Examples of these diluents are ethylene, propane, butane, pentane, hexane, various alkyl halides, perfluorinated hydrocarbons, etc. One of the chief items in this process is the cost of refrigeration, whether the cooling is obtained by the use of an internal refrigerant such as ethylene or propane, or by external means. Normally high molecular weight material is desired. The art has striven to obtain these high molecular weights at the highest possible reaction temperatures.

An object of this invention is the polymerization of iso-olefins. Another object of the invention is the preparation of high molecular weight isobutylene polymers. Still another object of the invention is an iso-olefin polymerization process wherein the polymerization reaction takes place in the presence of a particular catalyst and a particular inert hydrocarbon diluent. A specific object of the invention is the preparation of iso-olefin polymers at temperatures above those now required to produce polymers of the same molecular weight. Other objects will be apparent in the detailed description of the invention.

It has been discovered that the inert diluent present in the polymerization zone has a considerable effect on the molecular weight of the product. For the particular catalyst, hereinafter defined, highest molecular weight products are obtained when the inert diluent comprises essentially a cycloparaffin which does not contain any tertiary hydrogen atoms. Dialkylcycloparaffins of the gem type are within the scope of the invention. On the other hand cycloparaffins containing tertiary hydrogen atoms, such as, methyl cyclopentane, methyl cyclohexane, etc. produce polymers having molecular weights that are substantially the same as those obtainable with the conventional paraffinic diluents, such as, propane, butane and pentane. The members of this class which are useful for the preparation of higher molecular weight products are cyclopropane, cyclobutane, cyclopentane, cyclohexane, cycloheptane, cyclooctane, 1,1-dimethylcyclopentane, 1,1-diethylcyclopentane and 1,1-dimethylcyclohexane. Because of their low boiling point and low freezing points the preferred members are cyclopropane, cyclobutane and cyclopentane. Cyclohexane is a preferred diluent when the reaction temperature is above about −40° C.

While the amount of the diluent which must be present in the polymerization zone is dependent upon the type of iso-olefin, the reaction temperature and the diluent itself, in general it has been found that between about 20 and 1,000 volume percent, based on iso-olefin, is a suitable amount. It is preferred that a sufficient amount of diluent be present to dissolve the polymer formed. In general it is preferred to use between about 100 and 500 volume percent of diluent. Cyclopentane and cyclohexane are preferred diluents because of their solution power for even the highest molecular weight isobutylene polymers.

It is to be understood that the cycloparaffins of this invention include not only the substantially pure hydrocarbons, but also the commercial grades of these hydrocarbons, e. g., cyclopentane and cyclohexane may contain as much as 10% of materials other than the desired cycloparaffin. Although the results obtainable when using cycloparaffins containing substantial amounts of paraffinic and alkylcycloparaffinic material, i. e., less than about 10%, are not as good as those when using the essentially pure materials, these commercial grade materials are within the scope of the invention.

It is known that $AlCl_3$ and acetone form a stable complex containing 1 mol of $AlCl_3$ and 2 mols of acetone. This complex is a solid at ambient temperatures and has no catalytic effect for the polymerization of isobutylene. The solid complex readily takes up additional $AlCl_3$. The physical characteristics change with the change in amount of $AlCl_3$ present until at a mol ratio of $AlCl_3$ to acetone of less than about 1, a mobile liquid exists. This liquid readily dissolves AlCl₃ and becomes saturated at ambient temperatures when the liquid composition is about 75 weight percent AlCl₃ and 25 weight percent acetone. The saturated liquid has a freezing point of about −20° C. It is somewhat soluble in hydrocarbons, such as, paraffins, cycloparaffins, etc. at ordinary temperatures. The solubility in hydrocarbons decreases rapidly with decrease in temperature until at about −50° C. the AlCl₃-acetone liquid is substantially insoluble. The only significant thing about the mol ratio change of the AlCl₃-acetone liquid appears to be catalytic activity. The liquid having a mol ratio of at least 1 is a very powerful catalyst for the polymerization of iso-olefins. Some beneficial effect on catalytic activity is obtained by using a saturated solution, i. e., a solution at ordinary temperatures having an AlCl₃ to acetone ratio of about 1.3. The liquid having a mol ratio of 1 contains 69.7 weight percent of AlCl₃ and 30.3 weight percent of acetone. It is preferred to use AlCl₃-acetone agents containing between about 70 and 75 weight percent of AlCl₃.

The catalytic effect of the AlCl₃-acetone agent decreases very sharply at about −50° C. It is believed that this is the result of the precipitation of the agent from the isobutylene-paraffinic hydrocarbon diluent mixture. It has been discovered that this AlCl₃-acetone agent is extremely soluble in alkyl halides, particularly alkyl halides containing from 1 to 4 carbon atoms. Solutions containing as much as 50 weight percent of agent are readily prepared. It has been discovered that by the use of a preformed solution of AlCl₃-acetone agent having a composition: AlCl₃, 70–75 weight percent and acetone, 25–30 weight percent, in an alkyl halide containing from 1 to 4 carbon atoms, it is possible to prepare isobutylene polymers having molecular weights in excess of 25,000 at temperatures lower than about −20° C. (The composition of the agent may be expressed thus, an AlCl₃-acetone agent having a mol ratio of AlCl₃ to acetone from at least 1 to about 1.3.)

The alkyl halide should not only have a very high dissolving power for the AlCl₃-acetone agent, but also should have a freezing point at about or preferably below the reaction temperature. When operating with large amounts of inert hydrocarbon diluent, alkyl halides having a freezing point somewhat higher than the reaction temperature may be utilized. The alkyl halides which contain from 1 to 4 carbon atoms are particularly suitable for use in this process. It is preferred to use alkyl chlorides containing from 1 to 2 carbon atoms, i. e., methyl chloride and ethyl chloride. The amount of alkyl halide used is not critical as long as all of the agent is soluble therein. In general, control of the operation is easier when relatively dilute solutions of agent in alkyl halide are used.

The AlCl₃-acetone agent may be prepared in several ways. The simplest procedure is to slowly add acetone to substantially anhydrous finely powdered AlCl₃ while stirring the powder. A liquid will quickly appear on the surface of the solid AlCl₃ and gradually the entire mass will pass into the liquid phase. Addition of acetone should be stopped when the liquid is saturated, which point is readily determinable by the presence of solid undissolved AlCl₃. Another method of preparing the agent is to add AlCl₃ to the solid AlCl₃-acetone complex while kneading the solids. Heating the solids during the addition of AlCl₃ is helpful as the solid complex becomes a pasty solid at about 100° C.

Still another method of preparing the catalyst is to slurry AlCl₃ in an inert material such as diluent hydrocarbons or alkyl halides and add acetone to the slurry while agitating the slurry. The agent is readily recoverable from the inert diluent by distilling away the diluent.

The yield of high molecular weight polymer is dependent somewhat on the amount of catalyst introduced into the contacting zone. The amount of AlCl₃-acetone agent present in the contacting zone may be as little as 0.05 weight percent or less, and as much as 10 weight percent or more, based on iso-olefin present in the contacting zone. In general, it is preferred to use from about 0.1 to about 5 weight percent of the agent.

The catalytic agent is adversely affected—poisoned—by many sulfur-containing and oxygen-containing organic compounds. Alcohols and ketones are particularly objectionable. Water decomposes the AlCl₃-acetone agent and must be considered as a poison. Acetone itself acts as a poison when the amount added decreases the AlCl₃ to acetone mol ratio to below 1.

In order to obtain products having a molecular weight suitable for uses such as in high V. I. lube oils, it is necessary to carry out the polymerization reaction at a temperature below about 0° C.; in general the preferred operating temperature will be below about −20° C. In general as the reaction temperature is lowered, the molecular weight of the product is increased until at a temperature of about −150° C. a molecular weight in excess of 500,000 is obtained. The usual range of reaction temperatures for the production of solid polymers is between about −50° C. and −110° C. It is particularly desirable to carry out the reaction at a temperature below about −50° C. when the iso-olefin feed stock contains appreciable amounts of normal-olefins. The presence of n-olefins such as n-butenes and n-pentenes has a deleterious effect on the molecular weight of the product, which effect can be overcome in part by lowering the temperature of the polymerization zone.

The feed to this process may be any iso-olefin, but preferably one having not more than 6 carbon atoms, or the feed may be a mixture of iso-olefin and diolefin to produce a copolymer. The preferred diolefins are butadiene and isoprene.

The preferred iso-olefin is isobutylene. It is very difficult and very expensive to obtain isobutylene that is substantially free of n-butenes, i. e., butene-1 and butene-2. It has been discovered that AlCl₃-acetone agent is remarkably insensitive to the presence of n-butenes in the contacting zone. Virtually no adverse effect on the molecular weight of the product polymer takes place when the feed contains less than about 5% of n-butenes. Only a slight effect on the molecular weight takes place as the amount of n-butenes present increases to about 10–11%. At this composition the molecular weight of the product polymer decreases, yet when operating on a feed containing as much as 15% of n-butenes, it is possible to obtain a product polymer having a molecular weight in excess of 200,000 at a reaction temperature of about −60° C. The molecular weight of the product polymer decreases very rapidly when the n-butene content of the feed is greater than about 15% and at about 50% of n-butene in the feed, the molecular weight of the product polymer decreases to about 25,000.

The results obtainable by this process are illustrated by several examples. It is to be understood that these examples are illustrative only and do not limit the scope of the invention. The experiments were carried out in a glass 3-neck flask provided with a motor-driven stirrer and a thermometer. The inert diluent was added to the flask and the flask and contents were brought to the desired temperature by external cooling. A weighed amount of the polymerization feed was then added to provide the sample. A definite amount of AlCl₃-acetone agent alone or as a preformed solution in methyl chloride was added to the flask in a dropwise fashion. Usually each addition of catalyst resulted in a rise in temperature of the reaction mixture. This rise in temperature was noted. The contents of the flask were stirred for a given time and then the reaction was quenched by adding methanol. The diluent (and methyl chloride) were evaporated and the residual material in the flask was dissolved in hexane. The hexane solution was washed with water and dried over calcium chloride. An aliquot was concentrated in vacuo at 100° C. to determine polymer yield. Intrinsic viscosities were determined on samples dissolved in diisobutylene. The molecular weights referred to herein were obtained by the intrinsic viscosity method described by Flory—J. Am. Chem. Soc. 65,372 (1943).

Example I

In this experiment comparative tests were made when using cyclohexane and n-butane as the inert diluents. In each test the feed consisted of substantially pure isobutylene. Technical grade cyclohexane and n-butane were used. In each test 1.5 g. of AlCl₃-acetone catalytic agent were added to the flask; the catalyst was a substantially saturated solution of AlCl₃ in acetone, i. e., the agent contained about 72 weight percent AlCl₃. The object of this example was to obtain a product of approximately the same molecular weight when using different diluents. Therefore, the tests were carried out at different temperatures. In each test the maximum temperature rise on catalyst addition was about 3° C. The results of these tests are shown below:

| Test | $iC_4$-g. | Diluent-g. | Temp. °C. | Contact Time, Min. | Yield Wt. Percent | M. W. |
|---|---|---|---|---|---|---|
| 1 | 200 | Cyclohexane 500 | −29 | 40 | 72 | 103,000 |
| 2 | 105 | n-Butane 350 | −35 | 45 | 87 | 98,000 |

It is believed that in order to obtain a product of about 103,000 molecular weight when using n-butane as the inert diluent, it is necessary to operate at a temperature about 8° C. lower than when using cyclohexane as the diluent.

Example II

In this example comparative tests were run using as the inert diluent cyclopentane and n-butane. The tests were carried out at a temperature of −75° C. in order to obtain a very high molecular weight product. In both cases substantially pure isobutylene was used as the feed, and technical grade cyclopentane and n-butane as the inert diluent. In order to obtain a high molecular weight using the AlCl₃-acetone agent as the catalyst in each test, a preformed solution of agent in methyl chloride was used to introduce the catalyst into the flask. Owing to the low temperature of operation the temperature rise after each catalyst addition was about 25° C. In Test 3, 0.31 g. of a substantially saturated solution of AlCl₃-acetone solution was dissolved in 10 g. of methyl chloride and this solution was added to the flask. In Test 4, 0.63 g. of the catalytic agent was dissolved in 22 g. of methyl chloride and this preformed solution was added to the flask. The results of these tests are shown below:

| Test | $iC_4$-g. | Diluent-g. | Temp. °C. | Contact Time, Min. | Yield Wt. Percent | M. W. |
|---|---|---|---|---|---|---|
| 3 | 100 | Cyclopentane 400 | −75 | 8 | 69 | 402,000 |
| 4 | 100 | n-Butane 400 | −75 | 10 | 96 | 300,000 |

The polymerization occurs promptly on addition of catalyst and can be conducted either in a succession of batch reactions or in a continuous reaction. In either case, the polymer is preferably recovered by discharging the polymerized material, usually at conversions ranging from 70 to 95% based on monomers, into a flash tank containing warm water which kills the catalyst, volatilizes out the unpolymerized monomers and diluent, and converts the polymer from a slurry in cold reaction mixture into a slurry in warm water. Various slurry stabilizers and polymer stabilizers may be added to the flash tank. The polymer is then recovered by a straining operation followed by drying and hot milling.

Thus having described the invention, what is claimed is:

1. A process for the polymerization of iso-olefins, which process comprises treating an iso-olefin, at a temperature between about 0° and −150° C., with an effective amount of an AlCl₃-acetone catalyst wherein the mol ratio of AlCl₃ to acetone is from at least 1 to about 1.3, in the presence of an inert diluent comprising essentially a cycloparaffin which does not contain any tertiary hydrogen atoms.

2. The process of claim 1 wherein said diluent comprises essentially a hydrocarbon selected from the group consisting of cyclopropane, cyclobutane, cyclopentane, cyclohexane, cycloheptane, cyclooctane, 1,1-dimethylcyclopentane, 1,1-diethylcyclopentane and 1,1-dimethylcyclohexane.

3. The process of claim 1 wherein said catalyst contains between about 70 and 75 weight percent of AlCl₃ and between about 25 and 30 weight percent of acetone.

4. The process of claim 1 wherein said catalyst is present in an amount between about 0.05 and 10 weight percent, based on said iso-olefin.

5. The process of claim 1 wherein said iso-olefin is essentially isobutylene.

6. The process of claim 1 wherein said diluent is present in an amount between about 20 and 1,000 volume percent, based on said iso-olefin.

7. The process of claim 1 wherein said diluent comprises essentially cyclobutane.

8. The process of claim 1 wherein said diluent comprises essentially cyclopentane.

9. The process of claim 1 wherein said diluent comprises essentially cyclohexane.

10. The process of claim 1 wherein said diluent comprises a mixture of hydrocarbons containing at least about 90% cyclopentane.

11. A process for the production of solid high molecular weight isobutylene polymers, which process comprises treating at a temperature between about −50° and −150° C., isobutylene with a preformed solution consisting essentially of an AlCl₃-acetone agent, having the composition: AlCl₃ about 70 to 75 weight percent, and acetone about 25 to 30 weight percent, and an alkyl halide containing from 1 to 4 carbon atoms, wherein said agent is present in an amount between about 0.05 and 10 weight percent, based on said isobutylene, and wherein said treating is carried out in the presence of an inert diluent, which diluent comprises essentially a cycloparaffin which does not contain any tertiary hydrogen atoms.

12. The process of claim 11 wherein said alkyl halide is methyl chloride.

13. The process of claim 11 wherein said alkyl halide is ethyl chloride.

14. The process of claim 11 wherein said diluent comprises essentially a hydrocarbon selected from the group consisting of cyclopropane, cyclobutane, cyclopentane, cyclohexane, cycloheptane, cyclooctane, 1,1-dimethylcyclopentane, 1,1-diethylcyclopentane and 1,1-dimethylcyclohexane.

15. The process of claim 14 wherein said diluent comprises essentially cyclopentane.

16. The process of claim 14 wherein said diluent comprises essentially cyclohexane.

17. A process for the preparation of an isobutylene polymer, which process comprises contacting isobutylene at a temperature between about −50° and −110° C. with between about 0.1 and 5 weight percent, based on said isobutylene, of a catalyst consisting of about 70 to 75 weight percent of $AlCl_3$ and about 25 to 30% of acetone, in the presence of an inert diluent comprising essentially a hydrocarbon selected from the group consisting of cyclopropane, cyclobutane, cyclopentane, cyclohexane, cycloheptane, cyclooctane, 1,1-dimethylcyclopentane, 1,1-diethylcyclopentane and 1,1-dimethylcyclohexane, wherein said diluent is present in an amount between about 100 and 500 volume percent, based on said isobutylene.

18. A process for the production of isobutylene polymers having a molecular weight in excess of about 200,000, which process comprises contacting isobutylene at a temperature below about −50° C. with a preformed solution consisting of a catalytic agent and an alkyl chloride containing from 1 to 2 carbon atoms wherein said agent consists of about 70 to 75 weight percent of $AlCl_3$ and about 25 to 30 weight percent of acetone, and wherein said agent is present in an amount between 0.1 and 5 weight percent, based on said isobutylene, and in the presence of between about 100 and 500 volume percent of an inert diluent comprising essentially cyclopentane.

References Cited in the file of this patent

UNITED STATES PATENTS

| Number | Name | Date |
|---|---|---|
| 2,516,683 | Dornte | July 25, 1950 |

OTHER REFERENCES

Flory, J. Am. Chem. Soc., 65, 372, 378 (Mar. 1943).

Zapp et al., Ind. Eng. Chem., 38, 948, 949 (Sept. 1946).